(12) United States Patent
Liu

(10) Patent No.: US 9,354,772 B2
(45) Date of Patent: *May 31, 2016

(54) METHOD AND DEVICE FOR MOVEMENT OF IMAGE OBJECT

(75) Inventor: Yang Liu, Beijing (CN)

(73) Assignee: CHINA MOBILE COMMUNICATIONS CORPORATION, Beijing (CN)

(*) Notice: Subject to any disclaimer, the term of this patent is extended or adjusted under 35 U.S.C. 154(b) by 632 days.

This patent is subject to a terminal disclaimer.

(21) Appl. No.: 13/817,776

(22) PCT Filed: Aug. 9, 2011

(86) PCT No.: PCT/CN2011/078143
§ 371 (c)(1),
(2), (4) Date: Feb. 19, 2013

(87) PCT Pub. No.: WO2012/022228
PCT Pub. Date: Feb. 23, 2012

(65) Prior Publication Data
US 2013/0152004 A1 Jun. 13, 2013

(30) Foreign Application Priority Data
Aug. 20, 2010 (CN) .......................... 2010 1 0259848

(51) Int. Cl.
*G06F 3/048* (2013.01)
*G06F 3/0481* (2013.01)
*G06F 3/0488* (2013.01)

(52) U.S. Cl.
CPC ............ *G06F 3/04812* (2013.01); *G06F 3/048* (2013.01); *G06F 3/0481* (2013.01); *G06F 3/04883* (2013.01)

(58) Field of Classification Search
None
See application file for complete search history.

(56) References Cited

FOREIGN PATENT DOCUMENTS

| CN | 101308443 | 11/2008 |
|---|---|---|
| WO | WO-2009/032750 | 3/2009 |

OTHER PUBLICATIONS

International Search Report for International Application No. PCT/CN2011/078143 dated Oct. 27, 2011 (including English translation).

*Primary Examiner* — Stephen Alvesteffer
(74) *Attorney, Agent, or Firm* — Workman Nydegger

(57) ABSTRACT

Provided is a method for the movement of an image object. In the method: A. determining the direction of movement of an image object to be moved, and a module X corresponding to same; B. moving the module X along the direction of movement by one unit; determining whether or not an overlap exists between the module X and another module; if no overlap exists, making the post-movement state as a movement result, and terminating the process; if an overlap exists, restoring the module X to the original position; determining a minimum mirror area comprising the module X; flipping the minimum mirror area; C. determining whether or not the module X can continue to move along the direction of movement; if not, then the movement has failed, terminating the process; if yes, then moving the module X upwards by one unit from the direction of movement; determining whether or not an overlap exists between module X and another module; if no overlap exists, making the post-movement state as the movement result, and terminating the process; if an overlap exists, repeating step C. Also provided is a device for the movement of the image object. The user experience is enhanced by using the method and the device.

6 Claims, 5 Drawing Sheets

| | | | | x → |
|---|---|---|---|---|
| (1,0x100) | (1,0x100) | (0,NULL) | (0,NULL) | |
| (1,0x100) | (1,0x100) | (0,NULL) | (0,NULL) | |
| (0,NULL) | (0,NULL) | (0,NULL) | (0,NULL) | |
| (0,NULL) | (0,NULL) | (0,NULL) | (0,NULL) | | y ↓

US 9,354,772 B2

METHOD AND DEVICE FOR MOVEMENT OF IMAGE OBJECT

This application is a US National Stage of International Application No. PCT/CN2011/078143, filed on Aug. 9, 2011, designating the United States, and claiming the benefit of Chinese Patent Application No. 201010259848.8, filed with the Chinese Patent Office on Aug. 20, 2010 and entitled "Method and Apparatus for Moving Graphic Object", which are hereby incorporated by reference in their entireties.

FIELD OF THE INVENTION

The present invention relates to a mobile terminal technology and particularly to a method and apparatus for moving a graphic object.

BACKGROUND OF THE INVENTION

A smart mobile phone and other mobile terminals are typically provided with a display screen, of a specific size, corresponding to an area referred to as a display area, typically a rectangle, on which graphic objects corresponding to various applications, pictures, videos, etc., can be displayed, and a user can access a function corresponding to a graphic object (which can be an icon, a widget, a pure picture, etc.) by clicking on the graphic object. Furthermore the existing smart mobile phone and other mobile terminals may allow the user to drag the various graphic objects as needed, that is, to change the locations of the graphic objects, thus encouraging an access of the user. This may not a problem if there are a small number of graphic objects in the display area, but if there are a large number graphic objects (correspondingly there may be a small spare area), then different graphic objects may overlap so that a graphic object may be moved with failure, thus resulting in an inconvenient access of the user and degrading an experience of the user.

SUMMARY OF THE INVENTION

In view of this, a general object of the invention is to provide a method for moving a graphic object so as to improve a success ratio of moving a graphic object.

Another object of the invention is to provide an apparatus for moving a graphic object so as to improve an experience of a user.

In order to attain the foregoing objects, a technical solution of the invention is embodied as follows:

A method of moving a graphic object includes:
A. determining a module X and a movement direction corresponding to a graphic object to be moved;
B. moving the module X by one unit in the movement direction, determining whether the module X overlaps partially with another module, and if not so, then taking the status after the movement as a movement result and ending the process; otherwise, resuming the module X in location and determining and mirror-inverting a smallest mirrored area including the module X; and
C. determining whether the mirror-inverted module X can be further moved in the movement direction, and if not so, then indicating a movement failure and ending the process; otherwise, moving the module X by one unit in the movement direction, determining whether the module X overlaps partially with another module, and if not so, taking the status after the movement as a movement result and ending the process; otherwise, repeating the step C.

An apparatus for moving a graphic object includes:
a determining unit configured to determine a module X and a movement direction corresponding to a graphic object to be moved;
a first moving unit configured to move the module X by one unit in the movement direction, to determine whether the module X overlaps partially with another module, and if not so, to take the status after the movement as a movement result and to end the process; otherwise, to resume the module X in location and to determine and mirror-invert a smallest mirrored area including the module X; and
a second moving unit configured to determine whether the mirror-inverted module X can be further moved in the movement direction, and if not so, to indicate a movement failure and to end the process; otherwise, to move the module X by one unit in the movement direction, to determine whether the module X overlaps partially with another module, and if not so, to take the status after the movement as a movement result and to end the process; otherwise, to perform again the function of the second moving unit.

As can be apparent, with the technical solution of the invention, a module X corresponding to a graphic object to be moved is moved in a movement direction, and if there is no overlapping part with any other module, then the status after the movement is taken as a movement result; otherwise, the modules are swapped in location, thereby avoiding overlapping of different graphic objects and improving a success ratio of moving a graphic object. Furthermore the solution of the invention is highly extensible and can be applicable to mobile terminals with differently sized display areas. Moreover the solution of the invention is easy to implement and reliable to operate and will not be restricted by an operating system platform, a programming language, etc., and thus is convenient to spread.

DETAILED DESCRIPTION OF THE EMBODIMENTS

In view of the problem in the prior art, there are provided in embodiments of the invention a new solution of moving a graphic object so as to avoid overlapping of different graphic objects to thereby improve an experience of a user. The graphic object includes but will not be limited to an icon, a widget, a pure picture, etc.

In order to make the technical solution of the invention more apparent and clear, the solution of the invention will be further detailed below with reference to the embodiments and in connection with drawings thereof.

Figure 1:
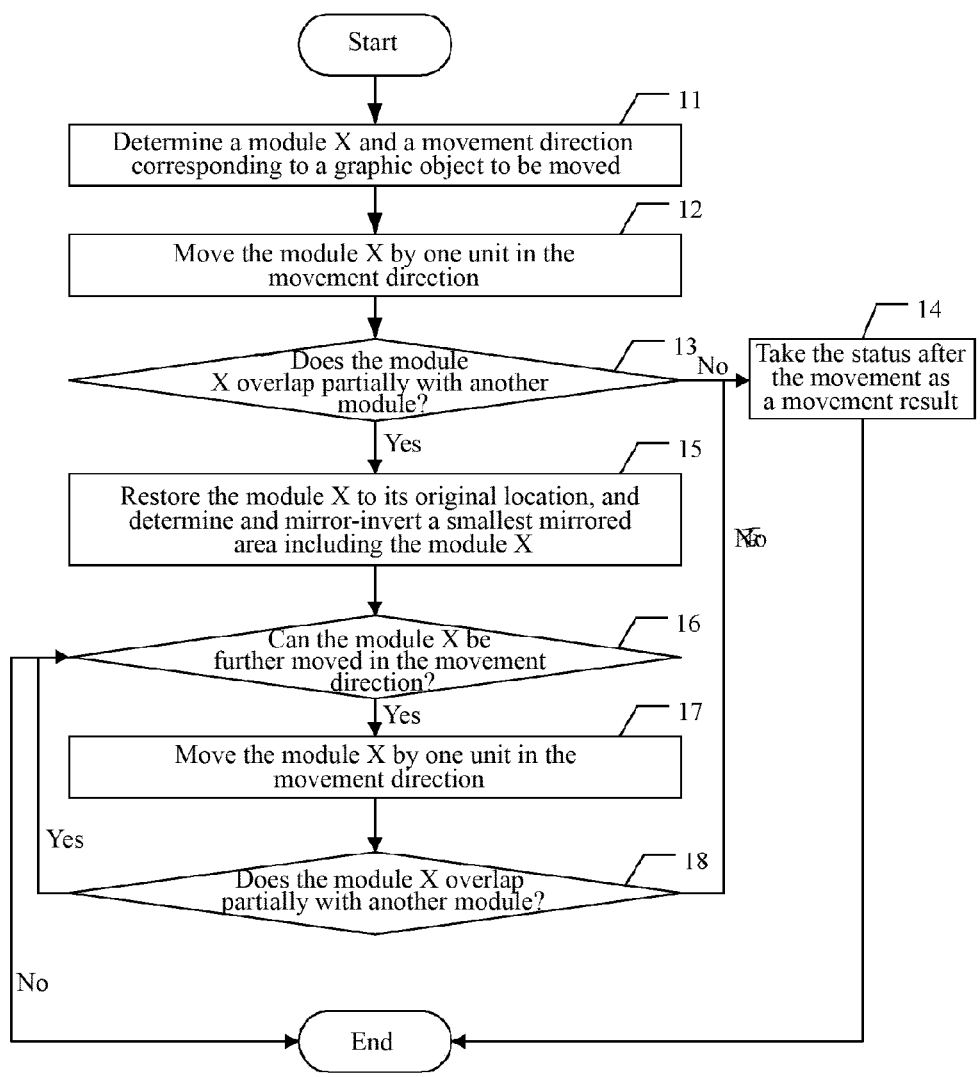
FIG. 1 is a flow chart of an embodiment of a method for moving a graphic object according to the invention.

FIG. 1 is a flow chart of an embodiment of a method for moving a graphic object according to the invention. As illustrated in FIG. 1, the method includes the following steps:

The step 11 is to determine a module X and a movement direction corresponding to a graphic object to be moved.

There may be differently sized display areas for different manufacturers and for different models of mobile terminals, e.g., possibly 320×240, i.e., a display area with a length of 320 units and a width of 240 units, or 800×480 or the like. Each graphic object may occupy an area with a specific size (with a length and a width smaller than or equal to the length and the width of the display area), and in this embodiment, an area corresponding to the graphic object to be moved is referred to be as a module X.

The module X and the movement direction corresponding to the graphic object to be moved can be determined by monitoring an operation of a user. For example, the user selects a graphic object 1 through a cursor and clicks on a Down key, and then the area corresponding to the graphic object 1 is determined as the module X, and the downward direction is determined as the movement direction. Of course, this is merely exemplary, and the invention will not be limited thereto.

The step 12 is to move the module X by one unit in the movement direction.

The step 13 is to determine whether the module X overlaps partially with another module, and if not so, then the process goes to the step 14; otherwise, the process goes to the step 15.

Figures 2, 3:
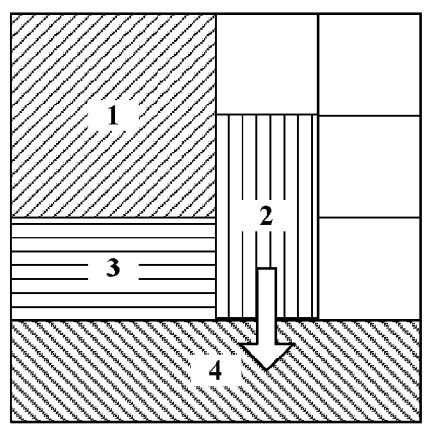
FIG. 2 is a schematic diagram of a mask table in the embodiment of the method according to the invention.
FIG. 3 is a schematic diagram of a display area in the embodiment of the method according to the invention.

In a practical application, a two-dimension struct array referred to as a mask table can be maintained for the display area. FIG. 2 is a schematic diagram of the mask table in the embodiment of the method according to the invention. As illustrated in FIG. 2, the size of the display area is assumed as 4×4, and each element in the mask table records two pieces of contents, one of which indicates whether a grid corresponding thereto is occupied, where if the grid is occupied, then the indicator is 1; otherwise, the indicator is 0; and the other of which indicates a memory address of a module occupying the grid (a memory address of each module is unique), where the memory address is Null when the grid is not occupied. As can be apparent from FIG. 2, four grids are occupied, and a memory address of the module occupying the four grids is 0×100.

Thus whether the moved module X overlaps partially with another module can be determined and which module overlapping therewith can be known by referring to the mask table.

The step 14 is to take the status after the movement as a movement result, and the flow ends.

The step 15 is to restore the module X to its original location and to determine and mirror-invert a smallest mirrored area including the module X.

In this embodiment a module overlapping partially with the module X moved by one unit in the movement direction in the step 13 can be defined as an obstructive module, and then this step can be performed particularly as follows:

1) The module X is restored to its original location;

2) A smallest envelope rectangular area A1 including the entire area of the module X (after restored to its original location) and the obstructive module;

3) It is determined whether there is a module partially located in the smallest envelope rectangular area A1, and if not so, then the smallest envelope rectangular area A1 is taken as the smallest mirrored area;

Otherwise, a smallest envelope rectangular area A2 including the entire area of the module partially located in the smallest envelope rectangular area A1, the module X and the obstructive module is further determined as the smallest mirrored area.

4) The smallest mirrored area is mirror-inverted by taking as an axis a line connecting midpoints of two sides of the smallest mirrored area, which are parallel to the movement direction of the module X, and a specific inversion approach falls into the prior art and thus a repeated description thereof will be omitted here.

The steps 11 to 15 will be further described below by way of specific examples.

FIG. 3 is a schematic diagram of the display area in the embodiment of the method according to the invention. As illustrated in FIG. 3, the size of the display area is assumed as 4×4, which includes 4 modules in total, i.e., a module 1, a module 2, a module 3 and a module 4 respectively, with the module 2 being the module corresponding to the graphic object to be moved.

Figure 4:
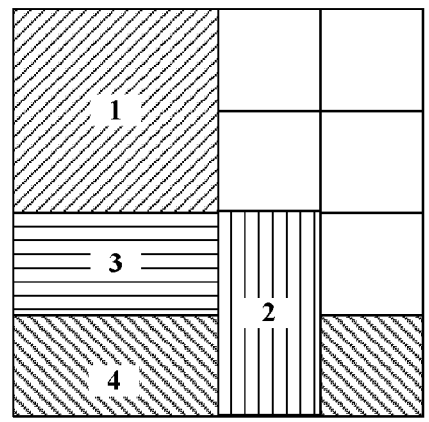
FIG. 4 is a schematic diagram after a module corresponding to a graphic object to be moved is moved by one unit in a movement direction in the embodiment of the method according to the invention.

FIG. 4 is a schematic diagram after the module corresponding to the graphic object to be moved is moved by one unit (i.e., one grid) in the movement direction in the embodiment of the method according to the invention. As illustrated in FIG. 4, the moved module 2 overlaps partially with the module 4, and then the module 4 is an obstructive module (the number of obstructive modules may be more than one in a practical application although there is only one here as an example).

Figure 5:
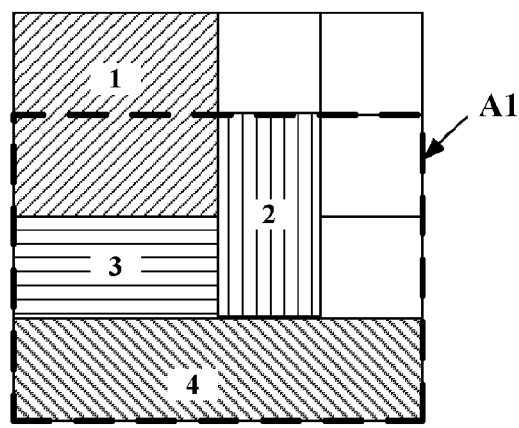
FIG. 5 is a schematic diagram of a smallest envelope rectangular area A1 determined in the embodiment of the method according to the invention.

FIG. 5 is a schematic diagram of the smallest envelope rectangular area A1 determined in the embodiment of the method according to the invention. As illustrated in FIG. 5, the smallest envelope rectangular area A1 includes the entire area of the module 2 and the module 4 and also includes the entire area of the module 3 and a part of the area of the module 1, so the smallest envelope rectangular area A1 can not be taken as a smallest mirrored area.

Figure 6:
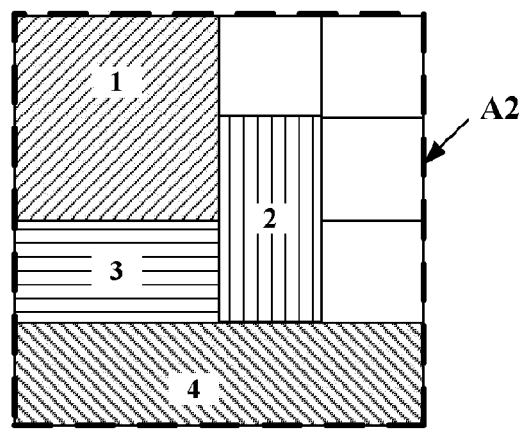
FIG. 6 is a schematic diagram of a smallest envelope rectangular area A2 determined in the embodiment of the method according to the invention.

FIG. 6 is a schematic diagram of the smallest envelope rectangular area A2 determined in the embodiment of the method according to the invention. As illustrated in FIG. 6, the smallest envelope rectangular area A2 includes the entire area of the module 2, the module 4 and the module 3 and also the entire area of the module 1 and thus is taken as a smallest mirrored area.

Figure 7:
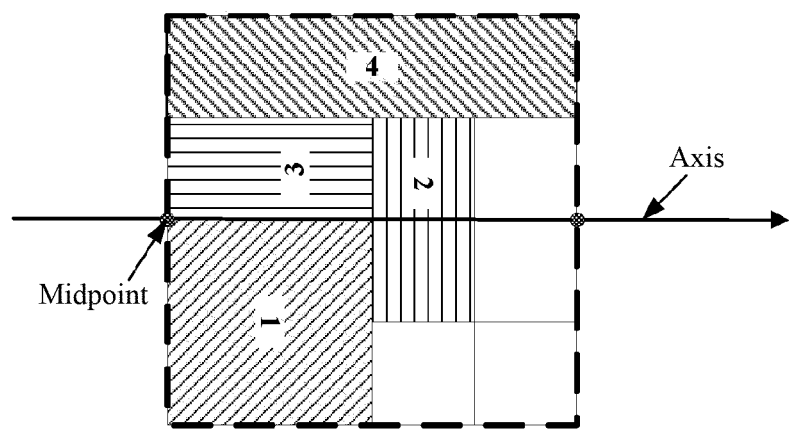
FIG. 7 is a schematic diagram of an inverted smallest mirrored area in the embodiment of the method according to the invention.

FIG. 7 is a schematic diagram of the inverted smallest mirrored area in the embodiment of the method according to the invention. As illustrated in FIG. 7, the smallest mirrored area is mirror-inverted by taking as an axis a line connecting midpoints of the two lines, i.e., left and right lines, of the smallest mirrored area.

The step 16 is to determine whether the module X can be further moved in the movement direction, and if not, then the movement fails, and the flow ends; otherwise, the process goes to the step 17.

In this step, the result after the mirror-inversion is processed. If a further movement goes beyond the display area, then it indicates that the module X can not be further moved.

The step 17 is to move the module X by one unit in the movement direction.

The step 18 is to determine whether the module X overlaps partially with another module, and if not so, then the process goes to the step 14, and then the flow ends; otherwise, the process goes back to the step 16.

In this step, it is determined whether the module X moved in the step 17 overlaps partially with another module, and different operations are performed in response to the determination result.

Thus the embodiment of the method illustrated in FIG. 1 has been introduced. Subsequently the foregoing process can be repeated if the user wishes to further move the graphic object.

Figure 8:
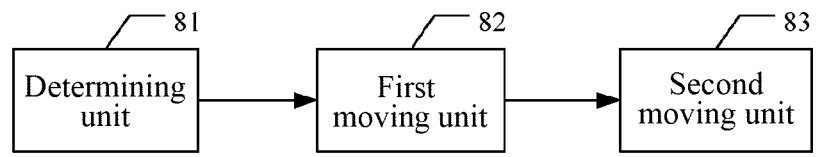
FIG. 8 is a schematic constituent structural diagram of an embodiment of an apparatus for moving a graphic object according to the invention.

The invention also provides an apparatus for moving a graphic object. FIG. 8 is a schematic constituent structural diagram of an embodiment of an apparatus for moving a graphic object according to the invention. As illustrated in FIG. 8, the apparatus includes a determining unit 81, a first moving unit 82 and a second moving unit 83.

Particularly the determining unit 81 is configured to determine a module X and a movement direction corresponding to a graphic object to be moved;

The first moving unit 82 is configured to move the module X by one unit in the movement direction, to determine whether the module X overlaps partially with another module, and if not so, to take the status after the movement as a movement result and to end the process; otherwise, to restore the module X to its original location and to determine and mirror-invert a smallest mirrored area including the module X; and The second moving unit 83 is configured to determine whether the mirror-inverted module X can be further moved in the movement direction, and if not so, to indicate a movement failure and to end the process; otherwise, to move the module X by one unit in the movement direction, to determine whether the module X overlaps partially with another module, and if not so, to take the status after the movement as a movement result and to end the process; otherwise, to perform again the function of the second moving unit.

Particularly the first moving unit 82 can further include a moving sub-unit and an inverting sub-unit (not illustrated for conciseness of the drawings);

The moving sub-unit is configured to move the module X by one unit in the movement direction, to determine whether the module X overlaps partially with another module, and if not so, to take the status after the movement as a movement result and to end the process; otherwise, to instruct the inverting sub-unit to function; and The inverting sub-unit is configured to determine as an obstructive module a module overlapping partially with the module X moved by one unit in the movement direction, to restore the module X to its original location, to determine a smallest envelop rectangular area A1 including the entire area of the module X and the obstructive module, to further determine whether there is a module partially located in the smallest envelop rectangular area A1, and if not so, to take the smallest envelop rectangular area A1 as the smallest mirrored area; otherwise, to determine as the smallest mirrored area a smallest envelop rectangular area A2 including the entire area of the module partially located in the smallest envelop rectangular area A1, the module X and the obstructive module; and to mirror-invert the smallest mirrored area by taking as an axis a line connecting midpoints of two sides of the smallest mirrored area, which are parallel to the movement direction of the module X.

Reference can be made to the foregoing description in the embodiment of the method illustrated in FIG. 1 for a specific operation flow of the embodiment of the apparatus illustrated in FIG. 8, and a repeated description thereof will be omitted here.

In summary, with the technical solution of the invention, a success ratio of moving a graphic object and thus an experience of a user can be improved.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for moving a graphic object, wherein the method comprises:

A. determining a module X and a movement direction corresponding to a graphic object to be moved;
B. moving the module X by one unit in the movement direction, determining whether the module X overlaps partially with another module, and if not so, then taking the status after the movement as a movement result and ending the process; otherwise, restoring the module X to its original location and determining and mirror-inverting a smallest mirrored area including the module X; and
C. determining whether the mirror-inverted module X can be further moved in the movement direction, and if not so, then indicating a movement failure and ending the process; otherwise, moving the module X by one unit in the movement direction, determining whether the module X overlaps partially with another module, and if not so, taking the status after the movement as a movement result and ending the process; otherwise, repeating the step C.

2. The method for moving a graphic object according to claim 1, wherein before the restoring the module X to its original location, the method further comprises: determine a module overlapping partially with the module X as an obstructive module; and
the determining a smallest mirrored area including the module X comprises:
determining a smallest envelop rectangular area A1 including the entire area of the module X and the obstructive module;
determining whether there is a module partially located in the smallest envelop rectangular area A1, and if not so, then take the smallest envelop rectangular area A1 as the smallest mirrored area;
otherwise, further determining as the smallest mirrored area a smallest envelop rectangular area A2 including the entire area of the module partially located in the smallest envelop rectangular area A1, the module X and the obstructive module as the smallest mirrored area.

3. The method for moving a graphic object according to claim 2, wherein the mirror-inverting the smallest mirrored area comprises:
mirror-inverting the smallest mirrored area by taking as an axis a line connecting midpoints of two sides of the smallest mirrored area, which are parallel to the movement direction of the module X.

4. The method for moving a graphic object according to claim 1, wherein the mirror-inverting the smallest mirrored area comprises:
mirror-inverting the smallest mirrored area by taking as an axis a line connecting midpoints of two sides of the smallest mirrored area, which are parallel to the movement direction of the module X.

5. An apparatus for moving a graphic object, wherein the apparatus comprises:
a memory has program codes stored therein; and
a processor, configured to execute the program codes to implement: determining a module X and a movement direction corresponding to a graphic object to be moved;
moving the module X by one unit in the movement direction, determining whether the module X overlaps partially with another module, and if not so, taking the status after the movement as a movement result and ending the process; otherwise, restoring-the module X to its original location and determining and mirror-invert a smallest mirrored area including the module X; and
determining whether the mirror-inverted module X can be further moved in the movement direction, and if not so, indicating a movement failure and ending the process; otherwise, moving the module X by one unit in the movement direction, determining whether the module X overlaps partially with another module, and if not so, taking the status after the movement as a movement result and ending the process; otherwise, performing again the function of the second moving unit.

6. The apparatus for moving a graphic object according to claim 5, wherein the processor is configured to further execute the codes to implement:
moving the module X by one unit in the movement direction, determining whether the module X overlaps partially with another module, and if not so, taking the status after the movement as a movement result and to end the process; otherwise, instructing-the inverting sub-unit to function; and
determining as an obstructive module a module overlapping partially the module X moved by one unit in the movement direction, restoring the module X to its original location, determining a smallest envelop rectangular area A1 including the entire area of the module X and the obstructive module, further determining whether there is a module partially located in the smallest envelop rectangular area A1, and if not so, taking the smallest envelop rectangular area A1 as the smallest mirrored area; otherwise, determining as the smallest mirrored area a smallest envelop rectangular area A2 including the entire area of the module partially located in the smallest envelop rectangular area A1, the module X and the obstructive module; and mirror-inverting the smallest mirrored area by taking as an axis a line connecting midpoints of two sides of the smallest mirrored area, which are parallel to the movement direction of the module X.

* * * * *